(12) United States Patent  (10) Patent No.: US 8,827,525 B2
Kim et al.  (45) Date of Patent: Sep. 9, 2014

(54) LED LIGHTING DEVICE WHICH HAS STABLE STRUCTURE AND IS EASILY ASSEMBLED AND DISASSEMBLED

(75) Inventors: Han Gyoul Kim, Seoul (KR); Hwa Young Kim, Seoul (KR); Il Yeong Kang, Seoul (KR); Jin Wook Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 191 days.

(21) Appl. No.: 13/406,817

(22) Filed: Feb. 28, 2012

(65) Prior Publication Data

US 2012/0224391 A1  Sep. 6, 2012

(30) Foreign Application Priority Data

Mar. 2, 2011 (KR) .................. 10-2011-0018405
Mar. 3, 2011 (KR) .................. 10-2011-0018909
Apr. 12, 2011 (KR) .................. 10-2011-0033606

(51) Int. Cl.
 *F21V 7/04* (2006.01)
(52) U.S. Cl.
 USPC ............ 362/609; 362/613; 362/615; 362/633
(58) Field of Classification Search
 USPC ......... 362/608, 609, 612, 613, 615, 617, 632, 362/633
 See application file for complete search history.

(56) References Cited

U.S. PATENT DOCUMENTS

| 6,608,332 | B2 |  | 8/2003 | Shimizu et al. ................. 257/98 |
| 7,503,685 | B2 | * | 3/2009 | Ura et al. ...................... 362/633 |
| 7,896,536 | B2 | * | 3/2011 | Arita et al. .................... 362/633 |
| 8,384,846 | B2 | * | 2/2013 | Park et al. ....................... 349/65 |
| 8,400,583 | B2 | * | 3/2013 | Yusa ............................... 349/64 |
| 8,432,525 | B2 | * | 4/2013 | Choi et al. .................... 349/158 |
| 8,434,926 | B2 | * | 5/2013 | Ryu et al. ..................... 362/634 |
| 8,529,115 | B2 | * | 9/2013 | Kim et al. ..................... 362/616 |
| 8,585,237 | B2 | * | 11/2013 | Kim et al. ..................... 362/224 |
| 8,622,599 | B2 | * | 1/2014 | Kim et al. ..................... 362/600 |

(Continued)

FOREIGN PATENT DOCUMENTS

KR  10-2009-0013911 A  2/2009
KR  10-1002668 B1  12/2010

OTHER PUBLICATIONS

European Search Report dated Jun. 22, 2012 issued in Application No. 12 15 7954.

(Continued)

*Primary Examiner* — John A Ward
(74) *Attorney, Agent, or Firm* — KED & Associates, LLP

(57) ABSTRACT

Disclosed is an LED lighting device which is easily assembled and disassembled and has a stable assemblability without structural shaking. The LED lighting device is able to improve a heat radiating characteristic and optical efficiency. The LED lighting device according to the embodiment includes a lower case; a light source unit disposed on one side of the lower case; a light guide plate disposed in parallel with the light source unit; and an upper case disposed on the light guide plate and coupled to the lower case in an attachable and removable way.

20 Claims, 7 Drawing Sheets

(56) References Cited

U.S. PATENT DOCUMENTS

| | | | |
|---|---|---|---|
| 2006/0072315 A1 | 4/2006 | Han et al. | 362/231 |
| 2009/0009679 A1 | 1/2009 | Ke et al. | 349/58 |
| 2009/0323371 A1* | 12/2009 | Ryu et al. | 362/615 |
| 2010/0027255 A1 | 2/2010 | Chang et al. | 362/235 |
| 2010/0067236 A1 | 3/2010 | Gassner et al. | 362/294 |
| 2010/0165655 A1 | 7/2010 | Alcov | 362/551 |
| 2010/0254121 A1 | 10/2010 | Zhou | 362/147 |
| 2011/0085107 A1* | 4/2011 | Noh et al. | 349/61 |
| 2011/0170034 A1* | 7/2011 | Jeong | 349/61 |
| 2011/0267841 A1* | 11/2011 | Lee et al. | 362/613 |
| 2012/0257107 A1* | 10/2012 | Itoh | 348/553 |

OTHER PUBLICATIONS

European Search Report dated Nov. 5, 2013 issued in Application No. 12 15 7954.

* cited by examiner

LED LIGHTING DEVICE WHICH HAS STABLE STRUCTURE AND IS EASILY ASSEMBLED AND DISASSEMBLED

CROSS-REFERENCE TO RELATED APPLICATIONS

The present application claims priority under 35 U.S.C. §119(e) of Korean Patent Applications Nos. 10-2011-0018405 filed on Mar., 2, 2011, 10-2011-0018909 filed on Mar., 3, 2011 and 10-2011-0033606 filed on Apr., 12, 2011, which is hereby incorporated by reference in its entirety.

BACKGROUND

1. Field

Embodiments may relate to a light emitting diode (LED) lighting device.

2. Background

An electric bulb or a fluorescent lamp is now widely used as an indoor or outdoor lighting lamp. However, the electric bulb or the fluorescent lamp has a short life span, so that it should be frequently changed. Moreover, as the use time of the electric bulb or the fluorescent lamp lapses, illuminance is deteriorated.

In order to overcome such problems, a conventional lighting device increasingly uses a light emitting diode (hereafter, referred to as LED). Because the LED has an excellent controllability, a rapid response speed, a high light conversion efficiency, a long life span, low power consumption and a high luminance value and improves an emotional lighting.

However, the conventional lighting device has its limited structure depending on an installation structure. Therefore, there is a demand for a lighting device which is not limited by the installation structure.

SUMMARY

One embodiment provides an LED lighting device having an improved assemblability.

The LED lighting device has a stable assemblability without structural shaking.

The LED lighting device improves a heat radiating characteristic.

The LED lighting device improves optical efficiency.

The LED lighting device according to the embodiment may include a lower case; a light source unit disposed on one side of the lower case; a light guide plate disposed in parallel with the light source unit; and an upper case disposed on the light guide plate and coupled to the lower case in an attachable and removable way.

The LED lighting device may further include a reflective sheet disposed between the light guide plate and the upper case.

Here, the lower case may include a body including two planes which are formed perpendicular to each other; a bezel formed extending perpendicular to one plane of the body; and a guide formed projecting perpendicular to the other plane of the body. In the lower case, an insertion groove in which a driver of the light source unit is disposed may be formed on one side of the body, and an opening may be formed in such a manner that the insertion groove is connected to the plane on which the light source unit is disposed.

The LED lighting device may further include a reflective sheet in the bezel of the lower case, to which the light guide plate is connected.

The lower case may include a plurality of guide recesses formed inside the body under the guide in the longitudinal direction of the body.

In the LED lighting device, a louver which adjusts a light direction may be inserted and set in the guide recess. The louver may be formed symmetrical or asymmetrical with respect to an opening of a case in accordance with an orientation angle of light which is emitted from the light guide plate. The louver may be made of a plastic material or a metallic material. An inner surface of the louver may be coated with a reflective material.

In the lower case, an effective area, that is, a light emitting area is determined by selectively setting a width or a size of the bezel, so that a light spot can be prevented.

The upper case may include a plate shaped base; and an edge formed extending from both sides of the base and having a level difference, which is stepped with respect to and extends from the base. An open access in which a driver of the light source is disposed may be formed on both sides of the base. In the upper case, a locking recess into which the substrate of the light source unit is inserted may be formed in the longitudinal direction of the edge on a junction between the base and the edge.

The light guide plate may include a pattern formed on one side thereof or a coating film having a roughness. One side of the light guide plate may include locally or entirely a shape of a plurality of lenses.

The light source unit may include: a rectangular substrate; a plurality of light emitting devices disposed on one side of the substrate in the longitudinal direction of the substrate; and a driving driver driving the light emitting device.

The LED lighting device may include a photo luminescent film disposed between the light source unit and the light guide plate. The photo luminescent film may include a transparent resin and a fluorescent material. The transparent resin may include at least one of a curing agent, an additive and a diffusing agent.

The LED lighting device may include a cap which is coupled to the side of the lower case and prevents light from being emitted from the side of the light guide plate.

The LED lighting device may further include a heat radiation sheet or a thermal grease between the upper case and the lower case or between the light source unit and the lower case.

Another embodiment is an LED lighting device. The LED lighting device may include: a light source unit; a light guide plate disposed in parallel with the light source unit; and a coating film which has a roughness and is disposed on the light guide plate.

The roughness of the coating film formed in an effective area where light is emitted to the outside through the light guide plate may be different from the roughness of the coating film formed in an ineffective area where the light is not emitted.

According to the embodiment, the lower case surrounding the light source unit and the light guide plate is attachable to and removable from the upper case. The reflective sheet and the light guide plate become closer to each other. The light source unit is stable fixed. The upper case is prevented from moving right and left. As a result, the LED lighting device has a stable supporting structure and is easily assembled and disassembled.

The heat radiation sheet is disposed on a contact area of the upper case and the lower case or disposed between the light source unit and the lower case, thereby radiating the heat generated from the light source unit to the outside. As a result, a heat radiating characteristic can be enhanced.

The cap is coupled to the side of the lower case and prevents light from being emitted from the side of the light guide plate. The photo luminescent film is disposed between the light source unit and the light guide plate. The reflective sheet is disposed in a contact area of the lower case and the light guide plate. The reflective sheet is disposed between the upper case and the light guide plate. The coating film having a roughness is formed on the top surface of the light guide plate. A plurality of the lenses are formed on the top of the light guide plate. As a result, optical efficiency can be improved.

The LED lighting device has no limited installation structure. A manufacturing cost of the LED lighting device can be reduced.

BRIEF DESCRIPTION OF THE DRAWINGS

Arrangements and embodiments may be described in detail with reference to the following drawings in which like reference numerals refer to like elements and wherein.

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

Hereafter, detailed technical characteristics to be embodied will be described in detail with reference to the accompanying drawings.

Figure 1:
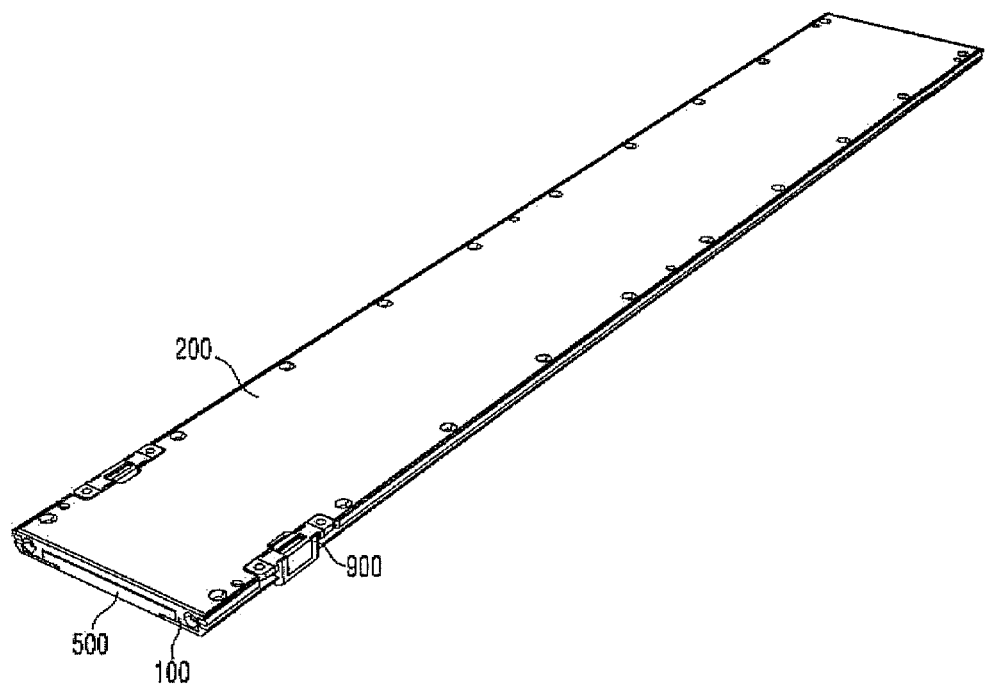
FIG. 1 is a perspective view of an LED lighting device according to an embodiment.
Figure 2:
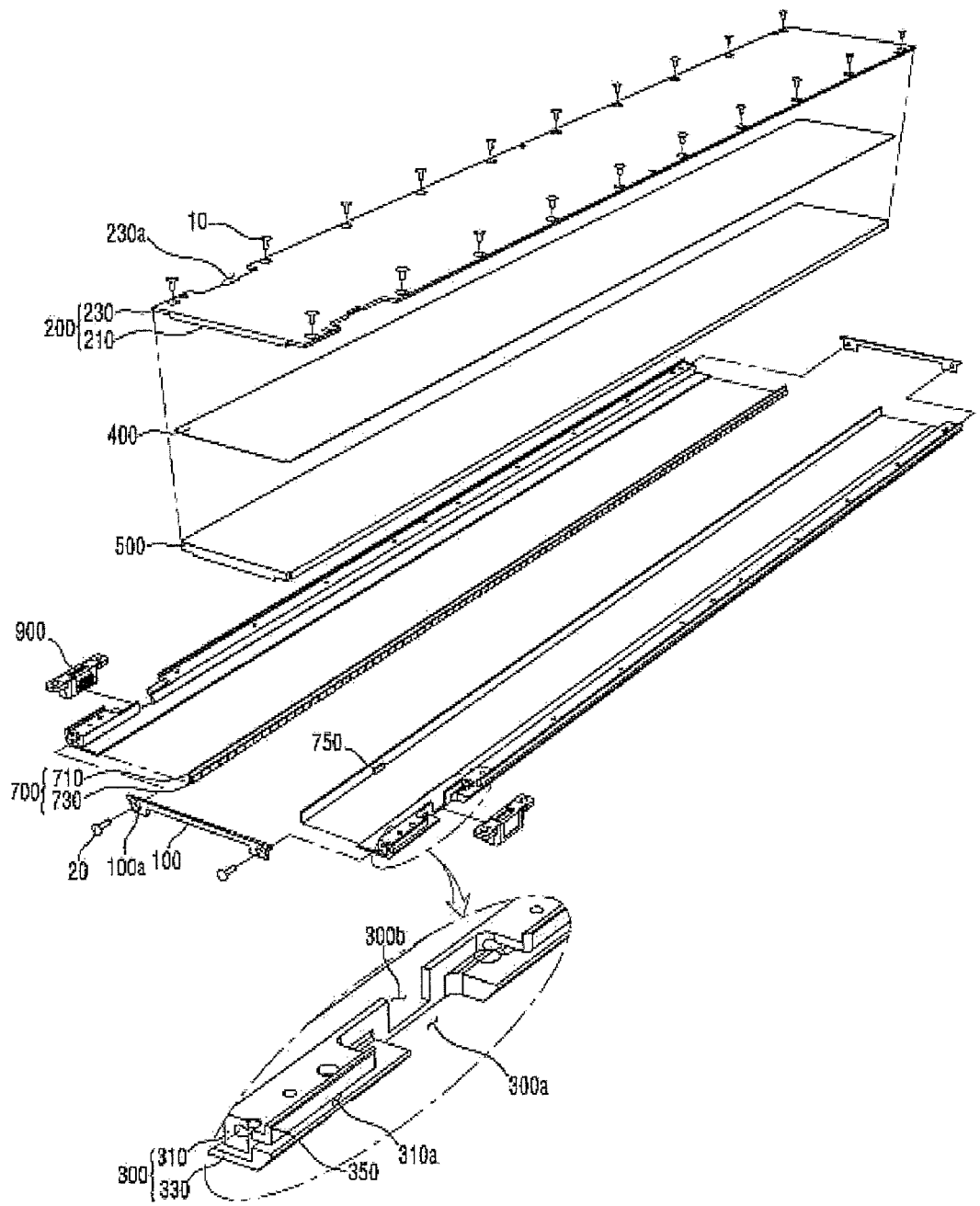
FIG. 2 is an exploded perspective view of the LED lighting device.
Figure 3:
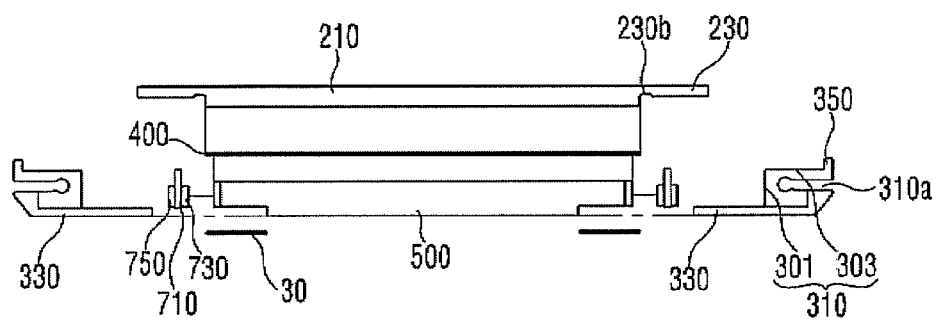
FIG. 3 is a side exploded view of the LED lighting device.
Figure 4:
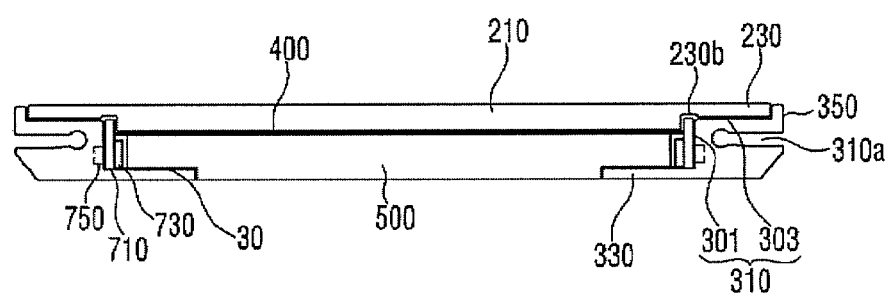
FIG. 4 is a side view of the LED lighting device.

FIG. 1 is a perspective view of an LED lighting device according to an embodiment. FIG. 2 is an exploded perspective view of the LED lighting device. FIG. 3 is a side exploded view of the LED lighting device. FIG. 4 is a side view of the LED lighting device.

Referring to FIGS. 1 to 4, the LED lighting device basically includes an upper case 200, a lower case 300, a light guide plate 500 and a light source unit 700. Further, in the embodiment, light can be prevented from being emitted through the light guide plate 500 by providing a cap 100 on the side of the lower case 300. Also, a reflective sheet 400 may be disposed between the upper case 200 and the light guide plate 500.

The upper case 200 and the lower case 300 function as a case of the LED lighting device and are disposed in an attachable and removable manner.

The upper case 200 includes, as shown in FIGS. 2 to 4, a plate-shaped base 210 and a right-left edge 230 which is stepped with respect to the base 210 and extends from the base 210. Here, the base 210 is formed thicker than the edge 230. When the upper case 200 is coupled to the lower case 300, the base 210 hereby presses the top of the reflective sheet 400, so that the reflective sheet 400 and the light guide plate 500 become closer to each other. Therefore, the reflective sheet 400 and the light guide plate 500 can be prevented from moving.

The edge 230 has a rectangular shape as a whole. An open recess (see reference numeral 230a of FIG. 2) in which a driver is disposed is formed in the right and/or left side of the edge 230. As shown in FIG. 3, a position of the edge 230, which is connected to the base 210, includes a locking recess 230b formed in the longitudinal direction of the edge 230. A substrate 710 of the light source unit 700 is inserted into the locking recess 230b. Consequently, the locking recess 230b functions to stably fix the light source unit 700.

The lower case 300 includes, as shown in FIGS. 2 to 4, a body 310 including two vertical planes 301 and 303, a bezel 330 extending perpendicular to the one vertical plane 301 of the body 310, and a guide 350 projecting perpendicular to the other vertical plane 303 of the body 310.

Here, the body 310 includes one side 301 on which the light source unit 700 is disposed and the other side 303 on which the edge 230 of the upper case 200 is disposed. The two planes 301 and 303 are perpendicular to each other. An insertion groove (see reference numeral 300a of FIG. 2) and an opening (see reference numeral 300b of FIG. 2) are formed in the side of the body 310. Here, the driver (see reference numeral 900 of FIG. 2) driving the light source unit 700 is disposed in the insertion groove 300a. The opening 300b is formed in such a manner that the insertion groove 300a is connected to the one plane 301 of the body 310, on which the light source unit 700 is disposed.

Meanwhile, the corner of the body 310 is rounded and relives external impact.

Subsequently, the body 310 includes a guide recess 310a formed inside the body 310 under the guide 350 in the longitudinal direction of the body 310. A plurality of the guide recesses 310a may be provided and disposed in parallel with the longitudinal direction of the body 310.

The guide recess 310a of the body 310 increases the surface area for heat radiation. Therefore, the guide recess 310a functions to effectively radiate heat generated from the light source unit 700.

A louver (see reference numeral 50 of FIGS. 8 to 10) which adjusts the light direction may be inserted and set in the guide recess 310a of lower case 300. The louver 50 functions to adjust the light direction when the light of the light source unit 700 is outwardly emitted through the light guide plate 500.

Subsequently, the bezel 330 of the lower case 300, as shown in FIGS. 3 and 4, supports both sides of the bottom surface of the light guide plate 500. When the light emitted from the light source unit 700 is outwardly emitted, the bezel 330 functions to prevent light spot generated due to a short optical path.

The bezel 330 determines an effective area, i.e., a light emitting area, depending on the width or size thereof. Therefore, in terms of optical efficiency, it is recommended that the bezel 330 should be reduced as much as possible in such a manner that the effective area is not reduced within a range in which no light spot is generated.

As shown in FIGS. 2 to 4, the guide 350 of the lower case 300 is molded in a projection shape, perpendicular to the other vertical plane 303 of the body 310. When the upper case 200 is coupled to the lower case 300, the guide 350 prevents the upper case 200 from moving right and left. Here, the height of the projecting guide 350 may be the same as the thickness of the edge 230 of the upper case 200.

After the upper case 200 is coupled to the lower case 300, the edge 230 of the upper case 200 is, as shown in FIG. 4, seated on the vertical plane 303 of the body 310 of the lower case 300. The upper case 200 is coupled to the lower case 300 by a screw 10. The upper case 200 and the lower case 300 have a quadrangular cross section having an open lower portion.

In the LED lighting device, when the structures disposed inside the case, such as the light source unit 700, the light guide plate 500 and the reflective sheet 400 need repairing, the upper case 200 can be separated from the lower case 300.

With regard to the LED lighting device, heat transfer characteristics of the upper and lower cases 200 and 300 are improved by disposing a heat radiation sheet (not shown). Therefore, a heat radiating characteristic can be enhanced.

The upper and lower cases 200 and 300 may be formed of a PC material which reduces the weights thereof and may be also formed of a material having a high thermal conductivity in order to excellently radiate heat generated from the light source unit 700 to the outside of the case. For example, the upper and lower cases 200 and 300 may be formed of at least one metallic material selected from the group consisting of Cu, Ag, Au, Ni, Al, Cr, Ru, Re, Pb, Cr, Sn, In, Zn, Pt, Mo, Ti, Ta and W, or may be formed of an alloy including the metallic materials.

Further, to add elasticity to the upper and lower cases 200 and 300, the upper and lower cases 200 and 300 may be formed of an elastic material.

Subsequently, the reflective sheet 400 has a plate shape corresponding to one side of the light guide plate 500 and is disposed between the upper case 200 and the light guide plate 500. Unlike the case, the reflective sheet 400 is made of a ductile material or a plastic material. If the base 210 of the upper case 200 is coated with a reflective material, the reflective sheet 400 may be removed.

When the light emitted from the light source unit 700 is emitted to the outside through the light guide plate 500, the reflective sheet 400 reflects the light emitted to the rear of the light guide plate 500, and then the light is emitted to the outside.

The light guide plate 500 is optically coupled to the light source unit 700. That is, the light guide plate 500 is disposed in parallel with the light source unit 700 and guides the path of the light emitted from the light source unit 700.

As shown in FIGS. 2 to 4, the light guide plate 500 has a rectangular plate shape and a level difference surface in the lower portion thereof. Here, the bezel 330 of the lower case 300 is disposed on the level difference surface and supports the light guide plate 500.

The light guide plate 500 functions to convert a point light source generated by the light source unit 700 into a surface light source. Here, one side of the light guide plate 500 may include a particular pattern formed thereon or a coating film (see reference numeral 510 of FIG. 5) having a roughness. The coating film 510 having the particular pattern or a roughness functions to diffuse or scatter the light, and then emits the light to the outside. The light guide plate 500 may be made of a transparent resin and may be printed by a silk-screen printing method.

Figure 5:
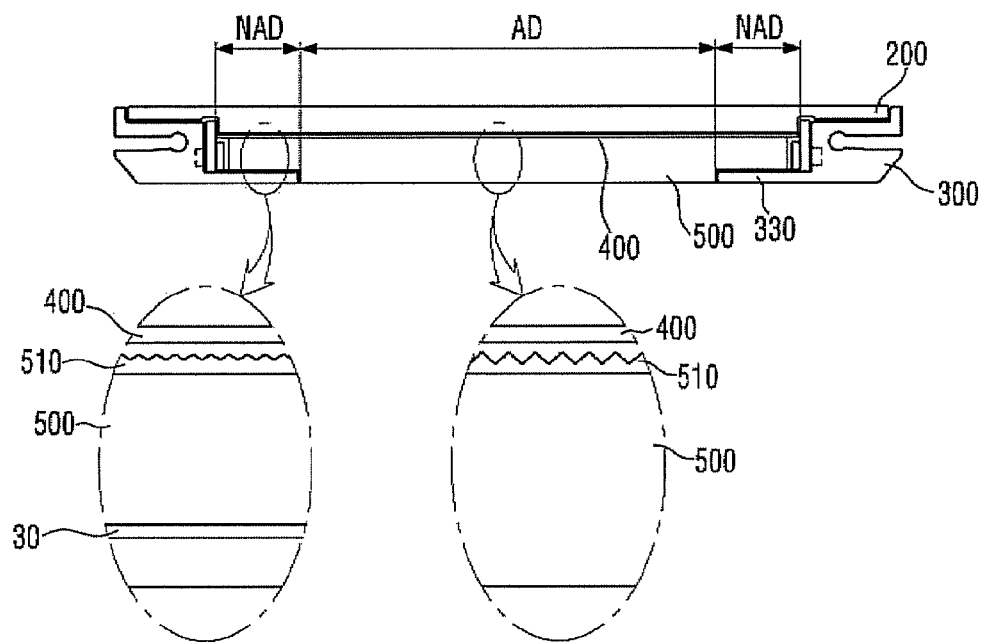
FIG. 5 is a cross sectional view showing a first structure of a coating film disposed on a light guide plate.

As shown in FIG. 5, the embodiment includes a reflective sheet 30 disposed in a contact area of the bezel 330 of the lower case 300 and the lower portion of the light guide plate 500. The reflective sheet 30 may be formed on the bezel 330 of the lower case 300 or may be disposed between the lower case 300 and the light guide plate 500.

When the light emitted from the light source unit 700 is irradiated to the bezel 330 of the lower case 300, the reflective sheet 30 enhances the back reflectance of the light, thereby substantially improving the optical efficiency of the light which is outwardly emitted.

The light source unit 700 includes, as shown in FIGS. 2 to 4, a substrate 710, a light emitting device 730 and a driving driver 750.

Here, the substrate 710 is a rectangular printed circuit board. The light emitting device 730 includes a plurality of LEDs and is disposed on one side of the substrate 710 in the longitudinal direction of the substrate 710. The light emitting device 730 includes the LEDs emitting the same colored light or includes the LEDs emitting differently colored lights. Therefore, light having various colors can be emitted by a combination of the two different colors, so that an emotional lighting device can be implemented. The LED includes a light emitting diode emitting at least one of blue, red and green colors.

Though not shown in the drawings, the LED is able to emit light having its own color due to a sealed transparent resin in the upper portion thereof. Here, the LED emitting blue light is also able to emit white light as well by using a resin including a yellow fluorescent material.

While the LED is taken as an example of a light source in the embodiment, any device capable of emitting light can be included in the light source, without being limited to this.

The driving driver 750 may be provided on the other side or end of the substrate 710, on which the light emitting device 730 is not disposed.

A plurality of the light source units 700 are provided and disposed on the body 310 of the lower case in such a manner that the light emitting devices 730 disposed on the substrate 710 face each other. Here, the substrates 710 of the light source unit 700 are, as shown in FIGS. 3 and 4, inserted into the locking recesses 230b of the upper case 200 respectively.

Though not shown in the drawings, a heat radiation sheet may be disposed on a contact area of the light sources unit 700 and the body 310 of the lower case 300. The heat radiation sheet can improve a heat radiating characteristic by transferring the heat generated from the light source unit 700 to the lower case 300 and radiating the heat to the outside.

In the LED lighting device of the embodiment, a photo luminescent film (not shown) including a fluorescent material may be disposed between the light source unit 700 and the light guide plate 500. The photo luminescent film functions to change the color of the light by converting a portion of the wavelength of the light emitted from the light source unit 700. Here, the photo luminescent film may include a transparent resin and a fluorescent material contained in the transparent resin. Here, a curing agent or an additive may be included in the transparent resin. The curing agent functions to cure the transparent resin. The additive functions to disperse uniformly the fluorescent material within the transparent resin. Also, a diffusing agent may be included in the transparent resin. Here, the diffusing agent functions to increasing the excitation ratio of the fluorescent material by improving the refractive index of the light source.

Subsequently, the driver 900 is, as shown in FIGS. 1 and 2, disposed to be inserted into the open recess 230a of the edge 230 of the upper case 200 and insertion groove 300a of the body 310 of the lower case 300. Then, the driver 900 is electrically connected to the driving driver (see reference numeral 750 of FIG. 2) of the light source unit 700 disposed on one side of the lower case 300.

Next, the cap 100 is disposed on the front and rear sides of the light guide plate 500 disposed within the case and prevents the light generated from the light source unit 700 from being emitted to the front and rear sides of the light guide plate 500. The cap 100 includes a coupling hole 100a which is coupled to a side of the guide recess 310a of the lower case 300 by means of a screw (see reference numeral 20 of FIG. 2). The cap 100 may be made of a metallic material or a lightweight plastic material.

FIG. 5 is a cross sectional view showing a first structure of a coating film disposed on a light guide plate.

Referring to FIG. 5, when the light emitted from the light source unit 700 is emitted to the outside through the light guide plate 500, a light emitting effective area "AD" is determined by an opening formed through the coupling of the upper case 200 and the lower case 300. Here, the light emitting effective area "AD" corresponds to an area through which the light emitted from the light source unit 700 is emitted to the outside the light guide plate 500. A light emitting ineffective area "NAD" corresponds to an area where the light which is emitted from the light source unit and passes through the light guide plate is not emitted by being blocked by the bezel 330 of the lower case 300.

The coating film 510 is formed on the light guide plate 500. The roughness may be formed on a portion of the surface of the coating film 510 or may be formed on the entire surface of the coating film 510 in order to improve the light uniformity. As a result, the light guide plate 500 causes the light emitted through the top surface of the light guide plate 500 to be diffused or scattered in direction of the bottom surface of the light guide plate 500, thereby improving not only the optical efficiency but the uniformity of the light which is emitted to the outside.

Though the roughness of the coating film 510 may be uniform on the entire surface thereof, the roughness may be different depending on the position of the surface of the coating film 510. In other words, the roughness of the coating film 510 formed in the central portion of the light guide plate 500, which corresponds to the light emitting effective area "AD" is larger than the roughness of the coating film 510 formed in the peripheral portion of the light guide plate 500, which corresponds to the light emitting ineffective area "NAD". This intends to substantially improve the light diffusivity effect and the light scattering effect by increasing the roughness of the portion of the coating film 510, which corresponds to the light emitting effective area "AD".

Though not shown in the drawings, the coating film 510 may be formed on the top and the bottom surfaces of the light guide plate 500. Here, the surface roughness of the coating film 510 of the bottom surface may be the same as or different from that of the top surface of the coating film 510. As a result, it is possible to improve the light uniformity and the optical efficiency.

Another embodiment will be provided. The same effect as the effect mentioned above can be obtained by forming the roughness on the bottom surface itself of the light guide plate 500 in place of the coating film 510 formed on the bottom surface of the light guide plate 500.

Figure 6:
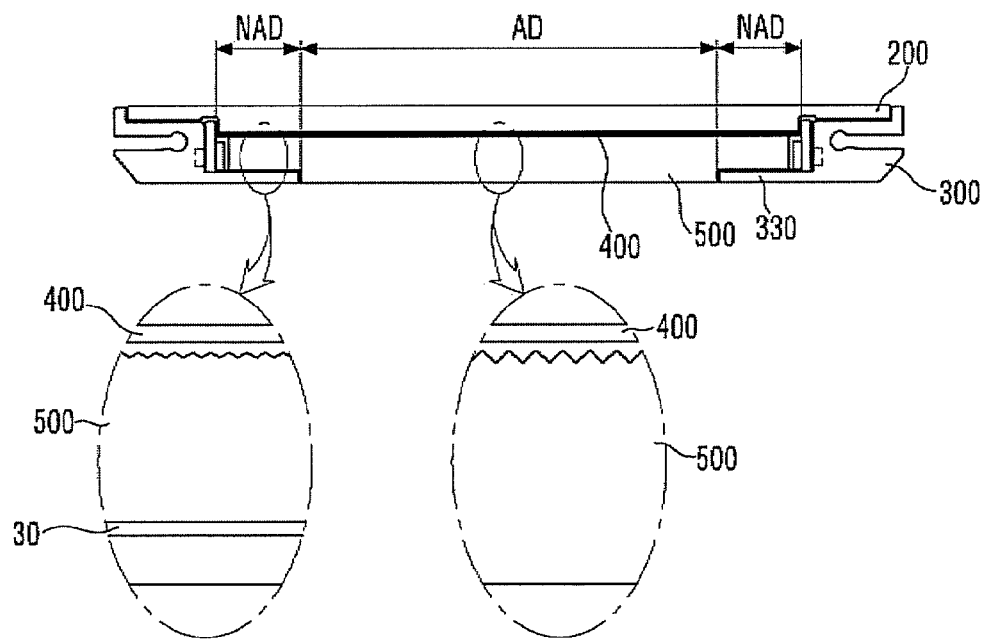
FIG. 6 is a cross sectional view showing a second structure of the coating film.

FIG. 6 is a cross sectional view showing a second structure of a coating film disposed on a light guide plate.

Referring to FIG. 6, as in FIG. 5, the light guide plate 500 corresponds to the light emitting effective area "AD" and the light emitting ineffective area "NAD". The roughness is locally or entirely formed on one side of the light guide plate 500.

Though the roughness may be uniformly formed on the entire surface of the light guide plate 500, the roughness may be different depending on the position of the surface of the light guide plate 500. In other words, the roughness formed in the central portion of the light guide plate 500, which corresponds to the light emitting effective area "AD" is larger than the roughness formed in the peripheral portion of the light guide plate 500, which corresponds to the light emitting ineffective area "NAD". This intends to substantially improve the light diffusivity effect and the light scattering effect by increasing the roughness of the surface of the light guide plate 500, which corresponds to the light emitting effective area "AD".

Though not shown in the drawings, the coating film 510 may be formed on the top and the bottom surfaces of the light guide plate 500. Here, the surface roughness of the coating film 510 of the bottom surface may be the same as or different from that of the top surface of the coating film 510. As a result, it is possible to improve the light uniformity and the optical efficiency.

Another embodiment will be provided. The same effect as the effect mentioned above can be obtained by forming the roughness on the bottom surface itself of the light guide plate 500 in place of the coating film 510 formed on the bottom surface of the light guide plate 500.

Figure 7:
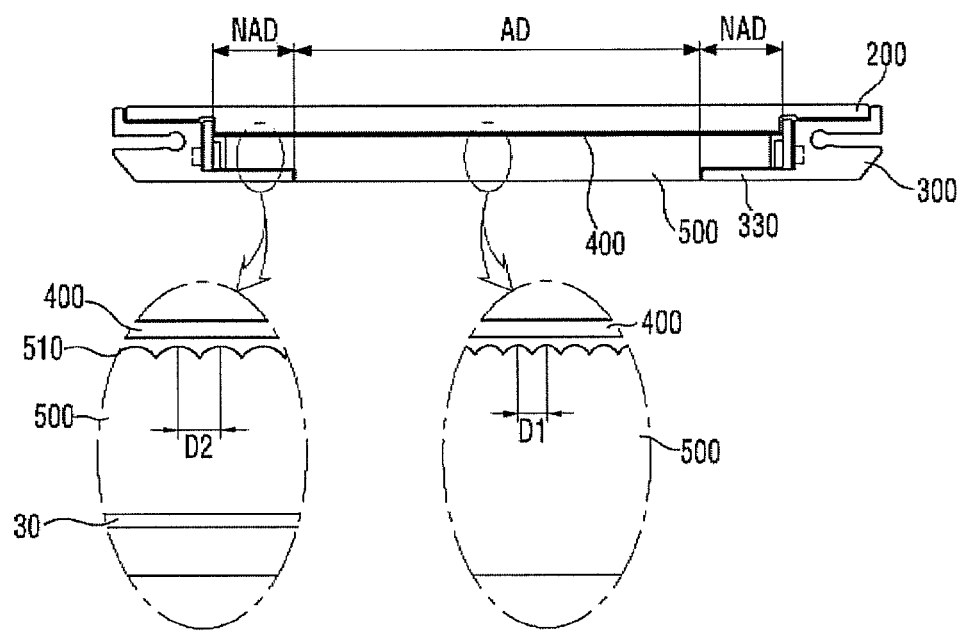
FIG. 7 is a cross sectional view showing a third structure of the coating film.

FIG. 7 is a cross sectional view showing a third structure of a coating film disposed on a light guide plate.

Referring to FIG. 7, as in FIG. 5, the light guide plate 500 corresponds to the light emitting effective area "AD" and the light emitting ineffective area "NAD", and has a shape of a plurality of lenses. Here, the lens has a size of a micro unit. The shape of the lens may be locally or entirely formed on the top surface of the light guide plate 500. Since a subsequent effect to this has been described above, a description of the effect will be omitted.

Distances between the lenses of the light guide plate 500 may be the same as each other on the entire surface of the light guide plate 500, or may be different from each other depending on a position of the light guide plate 500. That is to say, a distance "D1" between the lenses formed in the central portion of the light guide plate 500, which corresponds to the light emitting effective area "AD" is less than a distance "D2" between the lenses formed in the peripheral portion of the light guide plate 500, which corresponds to the light emitting ineffective area "NAD".

Though not shown in the drawings, the bottom surface itself of the light guide plate 500 may include a plurality of the lenses and a predetermined pattern formed therein.

Figure 8:
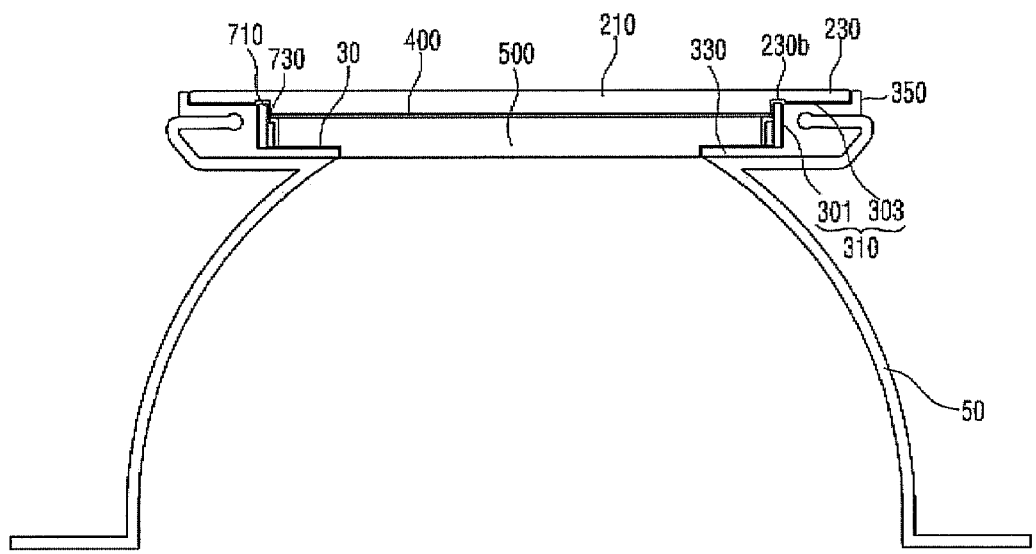
FIG. 8 is a cross sectional view showing a first structure of a lourver coupled to the LED lighting device.
Figure 9:
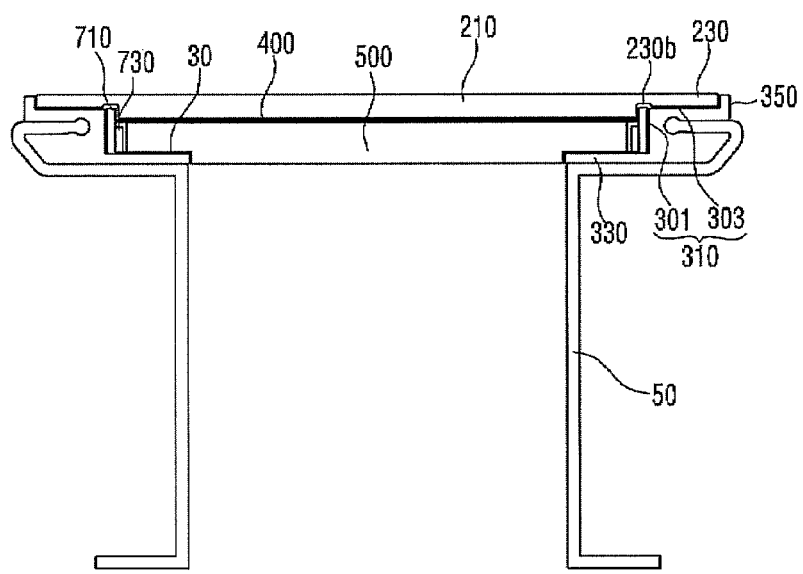
FIG. 9 is a cross sectional view showing a second structure of the lourver coupled to the LED lighting device.
Figure 10:
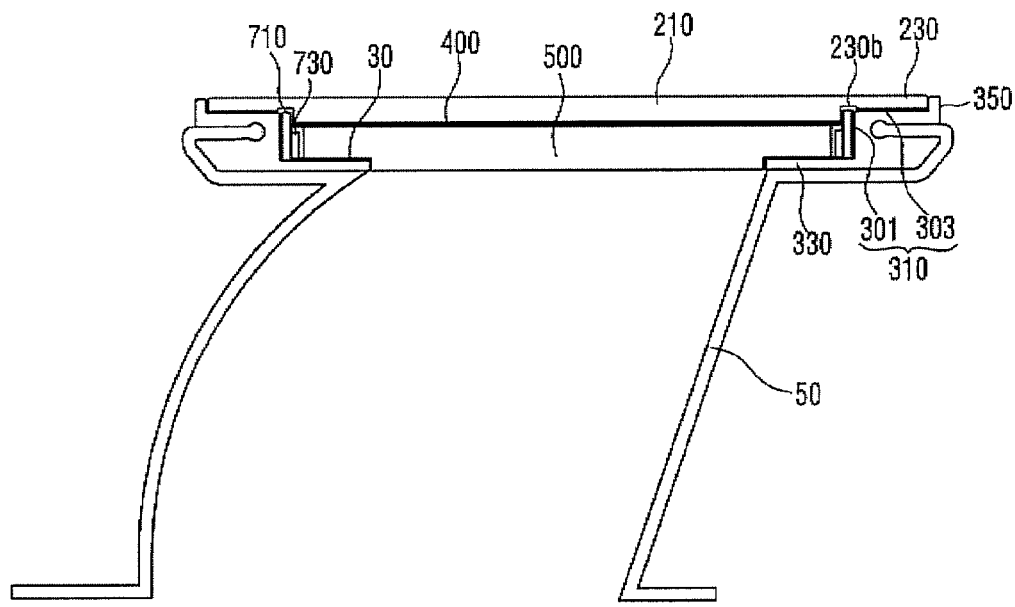
FIG. 10 is a cross sectional view showing a third structure of the lourver coupled to the LED lighting device.

FIGS. 8 to 10 are cross sectional views showing a first to a third structures a lourver 50 coupled to the LED lighting device.

Referring to FIGS. 8 to 10, the louver 50 is coupled in a sliding way to the both guide recesses 310a formed in the longitudinal direction of the body 310 of the lower case 300.

The louver 50 may be made of a plastic material or a metallic material. The inner surface of the louver 50 may be coated with a reflective material.

The shape of the louver 50 may be, as shown in FIGS. 8 and 9, symmetrical with respect to the opening of the case in accordance with the orientation angle of the light emitted from the light guide plate 500, or may be, as shown in FIG. 10, asymmetrical with respect to the opening of the case.

Depending on the size of a light irradiation area, FIG. 8 shows that some of the light irradiation direction of the louver 50 may be formed in the form of a symmetrical curve. FIG. 9 shows that some of the light irradiation direction of the louver 50 may be formed in the form of a symmetrical flat plane.

FIG. 10 shows that some of the light irradiation direction of the louver 50 may be formed in the form of an asymmetric structure including the curve and the flat plane.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. An LED lighting device comprising:
   a light guide plate including a top surface, a bottom surface and a side surface;
   an upper case including:
      a base disposed on the top surface of the light guide plate, and
      an edge extending from the base in parallel with the top surface of the light guide plate;
   a lower case coupled to the upper case and including a body, wherein the body includes a first plane at the side surface of the light guide plate and a second plane on which the edge of the upper case is disposed;
   a reflective sheet disposed between the top surface of the light guide plate and the base of the upper case; and
   a light source unit disposed on the first plane of the body of the lower case.

2. The LED lighting device of claim 1, wherein the second plane of the body of the lower case is perpendicular to the first plane of the body of the lower case.

3. The LED lighting device of claim 1, further comprising a driver for driving the light source unit,
   wherein the light source unit includes:
      a substrate;
      a light emitting device disposed on a first side surface of the substrate; and
      a driving driver disposed on a second side surface of the substrate and being electrically connected to the driver,
   wherein the body of the lower case has an insertion groove in which the driver and an opening is disposed.

4. The LED lighting device of claim 1, wherein the body of the lower case comprises a recess disposed at an outer surface of the body.

5. The LED lighting device of claim 4, further comprising a louver that adjusts a light direction is inserted and set in the guide recess, and wherein the louver is formed symmetrical or asymmetrical with respect to an opening of the lower case in accordance with an orientation angle of light that is emitted from the light guide plate.

6. The LED lighting device of claim 5, wherein the louver has a portion of the light irradiation direction formed in the form of a curve, a flat plane or a structure including the curve and the flat plane.

7. The LED lighting device of claim 5, wherein the louver is made of a plastic material or a metallic material, and wherein an inner surface of the louver is coated with a reflective material.

8. The LED lighting device of claim 1,
   wherein the light source unit includes a substrate and a light emitting device disposed on one side surface of the substrate, and
   wherein, the edge of the upper case has a locking recess into which the substrate is inserted is formed in a longitudinal direction of the edge.

9. The LED lighting device of claim 1, wherein the top surface of the light guide plate comprises a pattern having a roughness.

10. The LED lighting device of claim 1, wherein the top surface of the light guide plate comprises locally or entirely a shape of a plurality of lenses.

11. The LED lighting device of claim 1, further comprising a cap that is coupled to the side of the lower case and prevents light from being emitted from the side of the light guide plate,
    wherein the cap includes a coupling hole that is coupled to a side of the guide recess of the lower case by a screw.

12. The LED lighting device of claim 1, wherein the base of the upper case is formed thicker than the edge of the upper case.

13. The LED lighting device of claim 1, wherein the lower case comprises a guide extending upwardly from the second plane.

14. An LED lighting device comprising:
    a light guide plate including a top surface, a bottom surface and a side surface;
    a lower case including a body, wherein the body includes a first plane disposed at the side surface of the light guide plate and a second plane in parallel with the top surface of the light guide plate;
    an upper case including:
       a body disposed on the top surface of the light guide plate, and
       an edge extending from the base in parallel with the top surface of the light guide plate and disposed on the second plane of the lower case; and
    a light source unit disposed between the side surface of the light guide plate and the first plane of the body of the lower case.

15. The LED lighting device of claim 14, wherein the bottom surface of the light guide plate has a level difference surface, and wherein the lower case comprises a bezel extending perpendicular to the first plane and on which the level difference surface of the light guide plate is disposed.

16. The LED lighting device of claim 15, further comprising a coating film that has a roughness and is disposed on the top surface of the light guide plate,
    wherein the light guide plate comprises an effective area (AD) which light is emitted and an ineffective area (NAD) disposed on the bezel of the lower case, and
    wherein a roughness of the coating film formed in the effective area (AD) is greater than a roughness of the coating film formed in the ineffective area (NAD).

17. The LED lighting device of claim 15, wherein the top surface of the light guide plate comprises a pattern having a roughness,
    wherein the light guide plate comprises an effective area (AD) which light is emitted and an ineffective area (NAD) disposed on the bezel of the lower case, and
    wherein a roughness of the pattern formed in the effective area (AD) is greater than a roughness of the pattern formed in the ineffective area (NAD).

18. The LED lighting device of claim 15, further comprising a reflective sheet disposed between the level difference surface of the light guide plate and the bezel of the lower case.

19. The LED lighting device of claim 15, wherein a bottom surface of the bezel and the bottom surface of the light guide plate are disposed on a same plane.

20. The LED lighting device of claim 15, wherein the top surface of the light guide plate comprises a plurality of lenses, wherein the light guide plate comprises an effective area (AD) which light is emitted and an ineffective area (NAD) disposed on the bezel of the lower case, and
wherein a distance between the lenses formed in the effective area (AD) is less than a distance between the lenses formed in the ineffective area (NAD).

\* \* \* \* \*